United States Patent [19]

Jones et al.

[11] 4,117,652

[45] Oct. 3, 1978

[54] TRANSMISSION FOR SELF-PROPELLED, WALKING LAWN MOWERS

[75] Inventors: Ronald N. Jones, Fredericktown; Devin R. Cline, Mount Vernon, both of Ohio

[73] Assignee: The J. B. Foote Foundry Co., Fredericktown, Ohio

[21] Appl. No.: 728,044

[22] Filed: Sep. 30, 1976

[51] Int. Cl.² .................. A01D 35/26; B62D 51/04
[52] U.S. Cl. .................................. 56/11.8; 74/425; 180/19 R; 192/67 R
[58] Field of Search .................. 180/19 R, 70 R; 74/230.17 B, 425; 192/67 R; 56/11.8

[56] References Cited

U.S. PATENT DOCUMENTS

| | | | |
|---|---|---|---|
| 939,427 | 11/1909 | Main | 74/230.17 B |
| 2,314,035 | 3/1943 | Dontje | 180/19 R |
| 2,740,246 | 4/1956 | Smith et al. | 180/19 R |
| 2,860,473 | 11/1958 | Wehner | 180/19 H |
| 2,866,351 | 12/1958 | Wehner | 180/19 R |

Primary Examiner—Joseph F. Peters, Jr.
Assistant Examiner—Donn McGiehan
Attorney, Agent, or Firm—Allen D. Gutchess, Jr.

[57] ABSTRACT

A belt-driven transmission designed particularly for self-propelled, walking lawn mowers is provided. The transmission is mounted on a deck of a mower between a front pair or a rear pair of wheels and is driven through a pulley on the engine drive shaft and a pulley on the transmission connected by a belt. With this arrangement, the engine requires no special power take-off shaft to drive the mower. Consequently, the transmission can be universally applied to many different self-propelled lawn mowers. The new transmission can also be equipped with a deadman's clutch. Further, it can be provided with a manually-adjustable pulley of variable diameter to provide different speeds and torque for the drive shaft of the driven wheels. Also, in accordance with the invention, the drive shaft has a ratchet coupling device near each driven wheel to provide a differential effect for the wheels when the mower is being turned.

10 Claims, 13 Drawing Figures

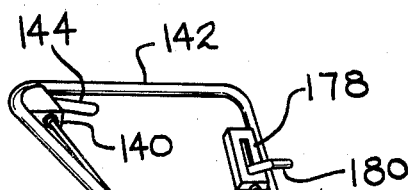
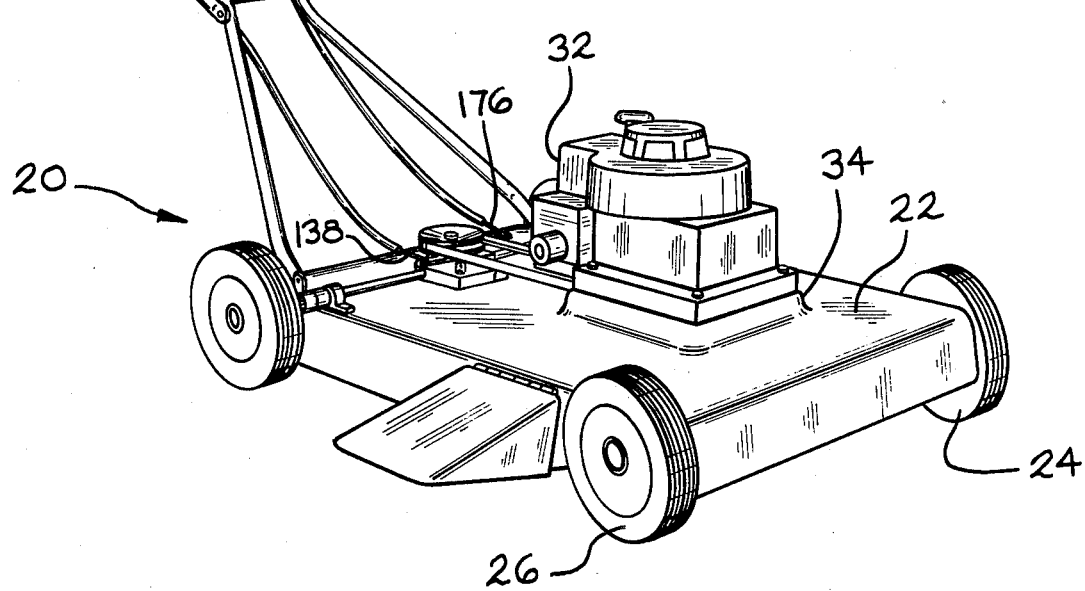

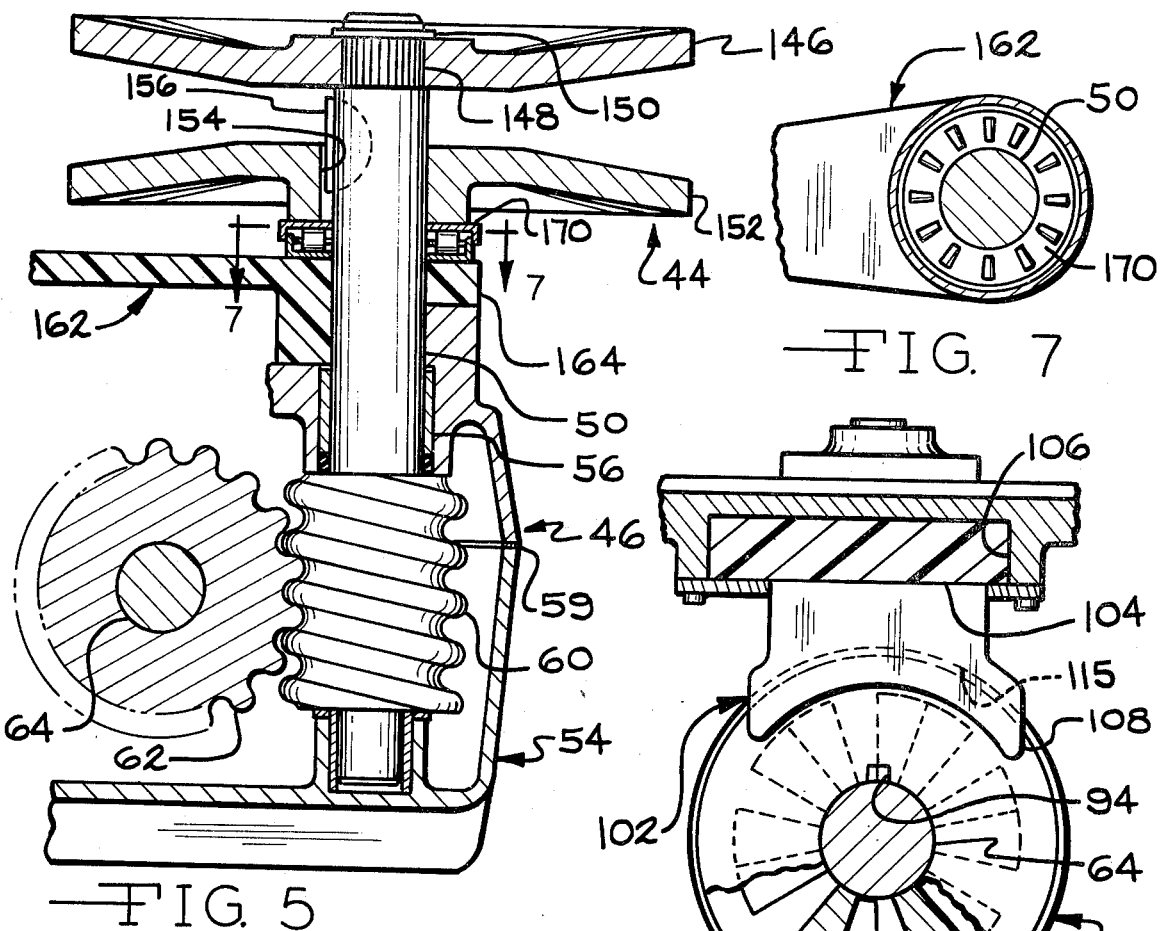
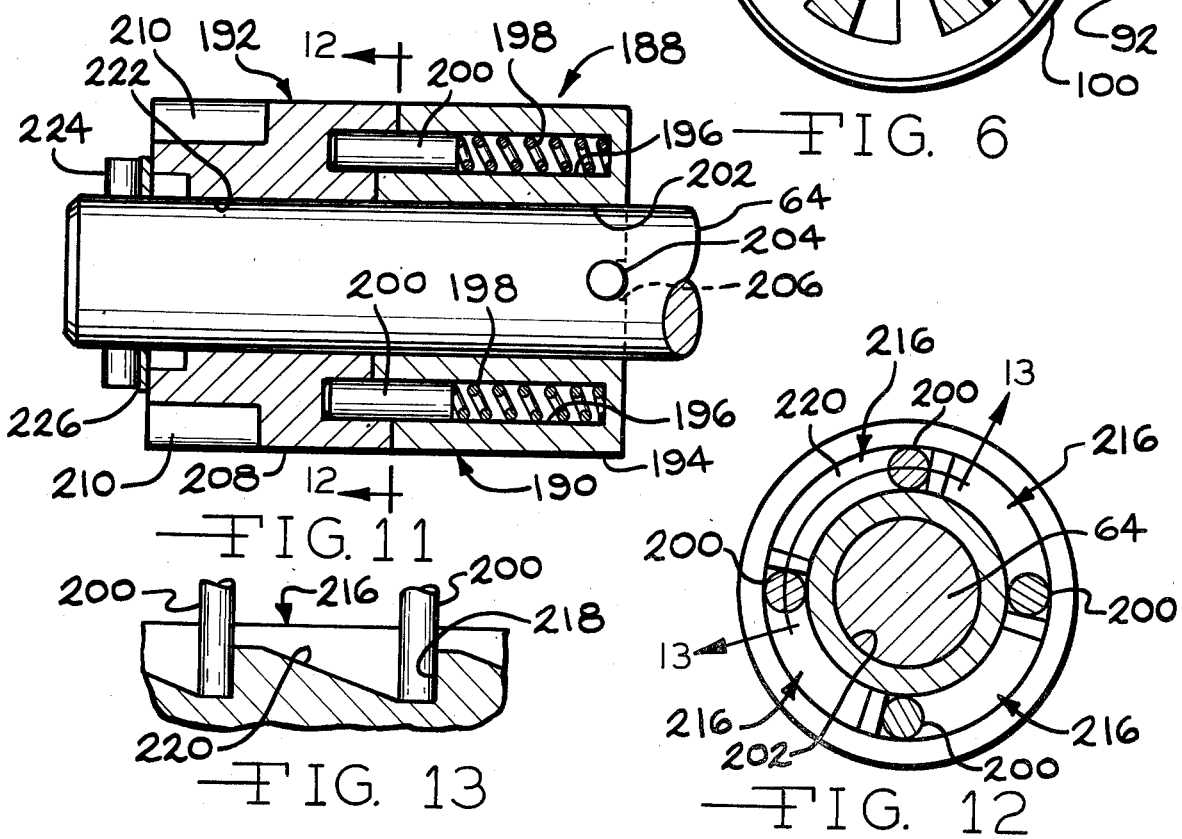

TRANSMISSION FOR SELF-PROPELLED, WALKING LAWN MOWERS

This invention relates to a universal transmission designed particularly for self-propelled, walking lawn mowers.

Heretofore, a self-propelled, walking lawn mower usually had a direct drive connection for the mower blade and for the mower wheels. The speed of the blade and wheels were controlled simultaneously only by the throttle of the engine. Consequently, excessive forward speed or stalling of the motor resulted under some conditions. These self-propelled lawn mowers usually required a special separate power take-off shaft for the internal combustion engine which resulted in a more costly engine and, consequently, in a higher priced mower to the consumer.

The new universal transmission according to the invention has a pulley which is driven through a belt connected to a drive pulley on a single drive shaft of the engine, the mower blade being mounted on or driven by the same drive shaft. The transmission pulley can be of a variable-diameter type which can be selectively controlled by the mower operator to vary the speed of the mower independently of the speed of the mower blade. The universal transmission also has a deadman's clutch to immediately disengage the transmission if a manually-operated control on the handle of the mower is released.

The drive shaft for the wheels to which the transmission is connected, can be provided near each driven wheel with a ratchet coupling device which enables the wheels to be driven in unison or one turned faster than the other to provide a differential effect. This is particularly important when the mower is being turned or otherwise manipulated along a nonlinear path.

It is, therefore, a principal object of the invention to provide an improved universal transmission for self-propelled lawn mowers.

Another object of the invention is to provide a transmission for self-propelled lawn mowers which is driven by an engine having a single drive shaft which also drives the mower blade.

Yet another object of the invention is to provide a universal, belt-driven transmission for self-propelled walking lawn mowers which is capable of driving the mower at widely varying speeds.

Still another object of the invention is to provide a transmission having a manually-adjustable, variable-diameter pulley on the input shaft.

A further object of the invention is to provide a transmission for self-propelled lawn mowers having a deadman's clutch for disengaging the transmission.

Yet a further object of the invention is to provide a transmission for self-propelled lawn mowers having a drive shaft equipped with ratchet coupling devices near the driven wheels to provide a differential effect for the wheels.

Many other objects and advantages of the invention will be apparent from the following detailed description of a preferred embodiment thereof, reference being made to the accompanying drawings, in which:

FIG. 1 is a somewhat schematic view in perspective of a self-propelled, walking lawn mower with a transmission embodying the invention;

FIG. 2 is an enlarged, fragmentary view in perspective of a portion of the lawn mower shown in FIG. 1;

FIG. 5 is a fragmentary view in vertical cross section taken along the line 5—5 of FIG. 3;

FIG. 6 is a view in vertical cross section taken along the line 6—6 of FIG. 4;

FIG. 7 is a fragmentary view taken along the line 7—7 of FIG. 5;

FIG. 11 is a view in longitudinal, vertical cross section taken through a ratchet coupling device on a drive shaft for the mower wheels;

FIG. 12 is a view in transverse cross section taken along the line 12—12 of FIG. 11; and FIG. 13 is a fragmentary view in cross section taken along the line of 13—13 of FIG. 12.

Figure 9:
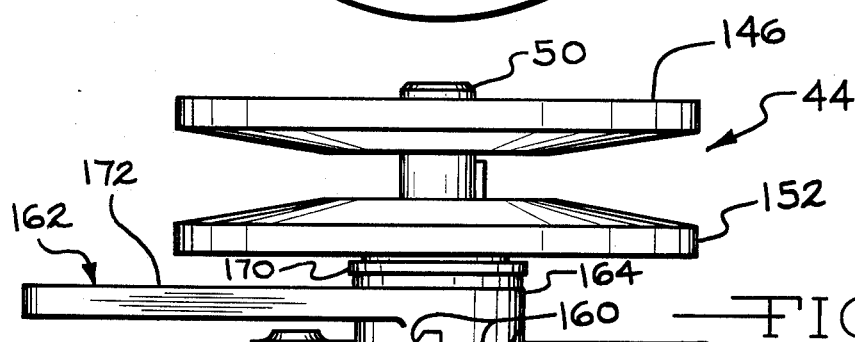
FIG. 9 is a rear view in elevation of the transmission.

Referring to FIGS. 1 and 2, a self-propelled, walking lawn mower 20 includes a metal deck 22 with a pair of front wheels 24, 26 and a pair of rear wheels 28, 30, the latter pair being driven in this instance. An internal combustion engine 32 is mounted on a raised portion 34 of the deck 22, the rear of the raised portion 34 being open. The engine 32 has a single, downwardly-depending drive shaft 36 on the end of which is mounted a suitable mower blade 38. A drive pulley or sheave 40 is affixed to intermediate portion of the drive shaft 36 above the main portion of the deck 22. A V-belt 42 connects the drive pulley 40 with a driven pulley 44 of a transmission 46 in accordance with the invention. The transmission 46, in this instance, is affixed in a recess 48 of the deck 22 by fasteners 49 (FIG. 9) to provide the desired alignment for the pulleys 40 and 44.

Referring particularly to FIG. 5, the pulley 44 is mounted on a vertical input shaft 50 of the transmission 46. The shaft is rotatably supported in a lower recess 52 of a lower housing half 54 and extends through a bushing 56 in an upper housing half 58, a gasket 59 being located between the two halves. A worm 60 is suitably affixed to the input shaft 50 and meshes with a worm wheel 62 which is rotatably mounted on an output or drive shaft 64.

The drive shaft 64 is rotatably supported in bushings 66 and 68 (FIG. 4) in the lower housing half 54 and is prevented from longitudinal movement by pins 70 and 72 extending through the shaft and positioned against washers 74 and 76 at opposite ends of the housing. A sealing ring 78 is located in the end of the bushing 68 and is held by a washer 80 and a pin 82 extending through the shaft 64.

The worm wheel 62 has a recess receiving a sealing ring 84 in the end of the bushing 66 and has an annular flange 86 near the opposite end cooperating with an upwardly extending flange 88 in the lower housing half 54. The worm wheel is thereby restrained from longitudinal movement on its shaft 64. Beyond the annular flange 86, the worm wheel 62 has a plurality of axially extending lugs or projections 90.

A clutch dog 92 has a groove 94 receiving a key 96 to cause the dog to rotate with a shaft 64. The dog 92 also has lugs or projections 98 engagable with the lugs 90 to cause the worm wheel 62 to rotate with the shaft when the lugs are engaged. This is accomplished when the clutch dog is moved toward the right, as shown in FIG. 4, through an annular flange 100.

Figure 3:
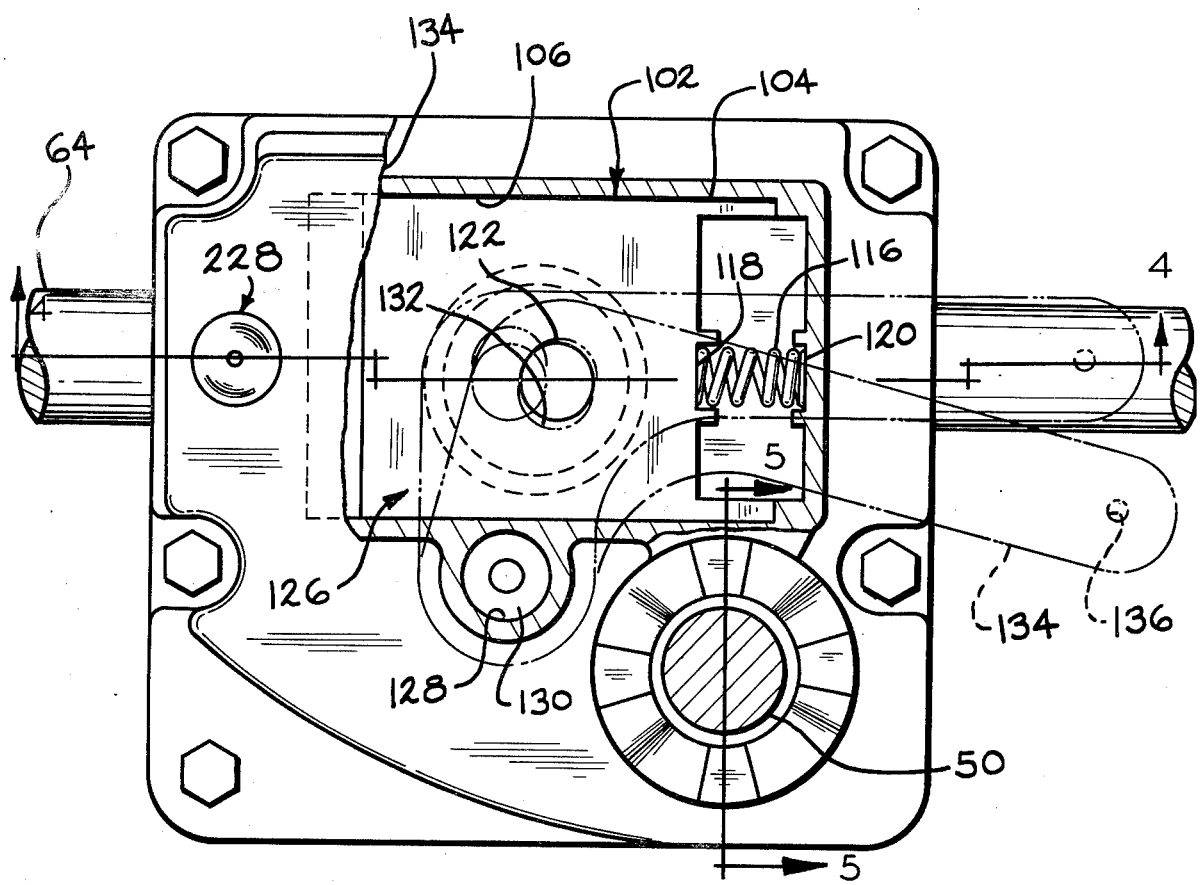
FIG. 3 is a plan view of the transmission, with parts removed and parts broken away, to show certain other components.
Figure 4:
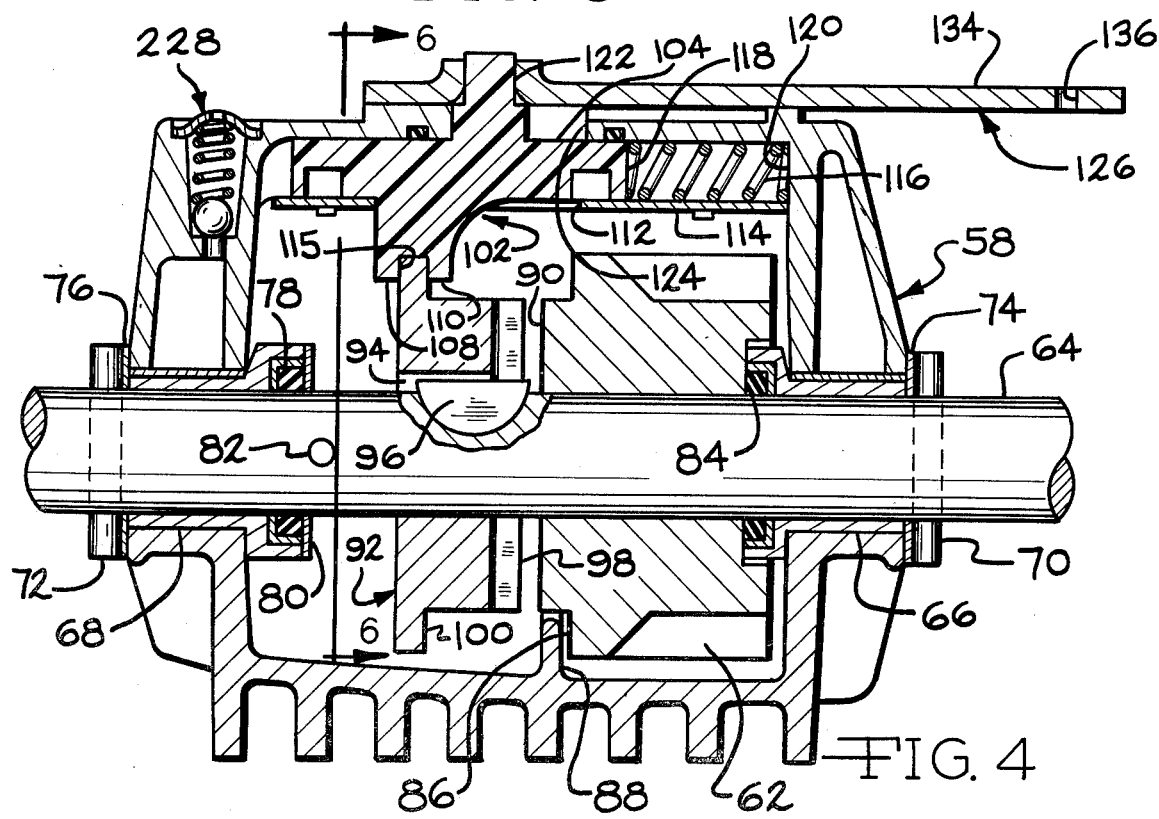
FIG. 4 is a view on transverse, vertical cross section taken along the line 4—4 of FIG. 3, but with certain components in a different position.

Referring to FIGS. 3, 4, and 6, the clutch dog 92 is moved longitudinally of the driven shaft 64 by a shifter fork 102. The fork 102 includes an upper, generally rectangular block 104 located in a recess 106 formed in the upper housing half 58 with a pair of arcuate ridges 108 and 110 extending down through an opening 112 (FIG. 4) in a divider plate 114 held in the housing half 58. The ridges 108 and 110 form an arcuate groove 115 which receives the flange 100 of the clutch dog 92. The shifter fork 102 and specifically the rectangular block 104 thereof is urged toward the left as viewed in FIG. 3 and 4 by a coil spring 116 having one end received in a shallow notch 118 of the block 104 and another end received in a notch 120 located at the end of the recess 106. The central portion of the block 104 has an integral pin or projection 122 extending upwardly through an opening 124 in the housing half 58. The pin is engaged to move the shifter fork back and forth in the recess 106 to move the clutch dog 92 into and out of engagement with the worm wheel 62.

The shifter fork is moved by an L-shaped lever 126 which has a hole 128 through which a lug 130 extends to pivot the lever to the upper housing half. The lever has an intermediate slot 132 which receives the projection 122 and also has an elongate handle 134 extending beyond the housing half 58. The end of the handle has a hole 136 or other suitable means to receive a flexible line or Bowden cable 138 (FIGS. 1 and 2) which extends upwardly to a lever assembly 140 mounted on an upper portion of a mower handle 142. The lever assembly 142 has a lever 144 which is grasped and pulled by the operator when operating the mower. This action pulls up on the cable 138 to move the lever 126 in a clockwise direction as viewed in FIG. 3. This, in turn, moves the shifter fork 102 to the right as viewed in FIGS. 3 and 4 to cause the clutch dog 92 to engage the worm wheel 62. Whenever the lever 144 is released by the operator, the spring 116 returns the shifter dog 102 to the left hand position and disengages the driven mower wheels 28 and 30 from the engine 32.

If desired, the transmission 46 can incorporate safety provisions to prevent starting of the engine 32 when the transmission is engaged. This can be in the form of a safety switch as shown in U.S. Pat. No. 3,808,914, of Hans Hauser, issued Feb. 5, 1973, for example. The switch is wired into the ignition system of the engine in a manner to enable the engine to be started only when the switch terminals are connected and the transmission is disengaged.

Figure 10:
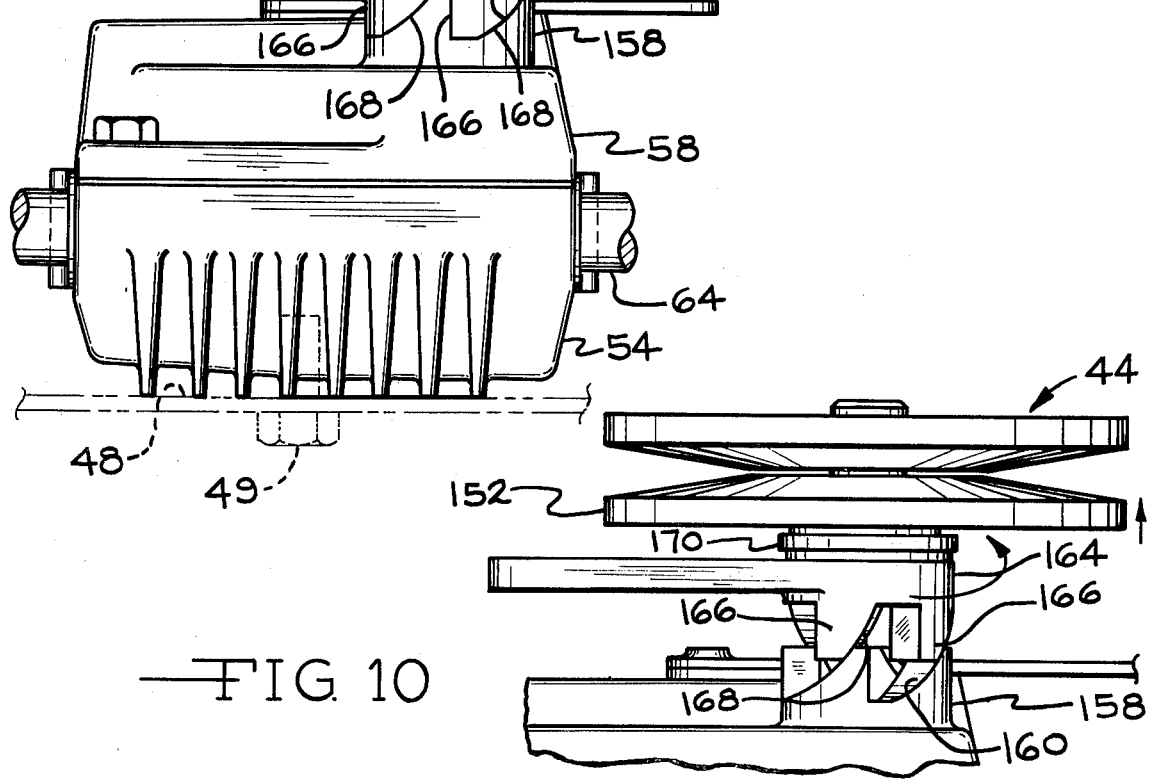
FIG. 10 is a fragmentary view of a portion of the transmission as shown in FIG. 9, with certain components thereof in a different position.

The pulley 44 on the input shaft 50 can be of a variable-diameter type to provide change in the speed and the torque applied to the wheels 28 and 30 through the shaft 64. The pulley 44 then includes an upper stationary half 146 which is affixed to a splined end 148 (FIG. 5) of the input shaft 50 and held by a split ring 150. The pulley also includes a lower half 152 which is mounted for axial movement on the shaft 50 but prevented from rotation by a groove or key way 154 cooperating with a shaft key 156. For the purpose of moving the lower pulley half 152 toward and away from the upper half 146, the upper housing half 58 is provided with a plurality of upwardly extending projections 158 (FIGS. 9 and 10) arranged in a circular pattern around the input shaft 50 and having sloping surfaces 160.

A speed change lever 162 is located above the upper housing half 58 and has a hub 164 with downwardly facing projections 166. The projections 166 are also arranged in a circular pattern around the input shaft 50 and have sloping cam surfaces 168 cooperating with the surfaces 160. A thrust washer 170 (FIGS. 6 and 7) is located between the hub 164 and the lower pulley half 152 to prevent wear of the lever 162 which can be of plastic material, such as nylon. A handle 172 extends outwardly from the hub 164 and beyond the pulley 44, in the direction opposite the direction of the handle 134 of the shift lever 126. The handle 172 has a hole 174 or other suitable means for making a connection with a flexible line or Bowden cable 176 (FIGS. 1 and 2) which extends upwardly to a speed control assembly 178 mounted near the mower handle 142. The assembly 178 has a speed control lever 180 which moves the cable 176 back and forth, holding it in a given place by virtue of a friction fit or detent in the assembly 178.

Figure 8:
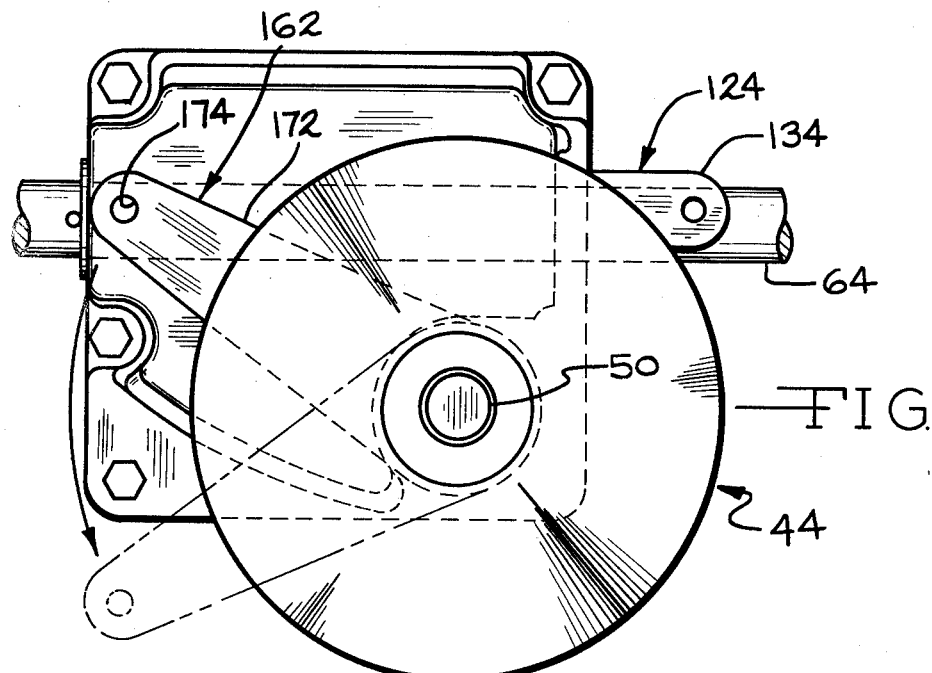
FIG. 8 is a top, plan view of the universal transmission.

When the cable 176 is pulled, the handle 172 moves in a counterclockwise direction as viewed in FIG. 8. This causes the lever 162 to move upwardly due to the camming effect of the sloping surfaces 168 and 160. The lower pulley half 152 thereby moves upwardly to increase the effective diameter of the pulley 44. This reduces the rotational speed of the output shaft 64 and the driven wheels 28 and 30, but increases the torque to them. As the diameter of the pulley 44 varies, the belt 42 is maintained taut by an idler pulley 182 (FIG. 2) which is urged outwardly by a suitable spring in a housing 184.

The transmission 46 drives the wheels 28 and 30 through the drive shaft 64 and ratchet coupling devices 186 and 188 (FIG. 2) located at the ends of the drive shaft 64. Referring to FIGS. 11-13, the device 188 includes an inner, drive member 190 and an outer, driven member 192. The member 190 includes a cylindrical body 194 having recesses 196 carrying coiled springs 198 which urge pins 200 outwardly in an axial direction. The body 194 has a central passage 202 which receives the drive shaft 64 with the body being connected to the drive shaft by a transverse pin 204 extending through the shaft and received in notches 206 of the body 194.

The outer member 192 has a cylindrical body 208 with tooth means in the form of pinion gear teeth 210 which mesh with tooth means in the form of gear teeth 212 (FIG. 2) on a disc 214 affixed to the inner surface of the hub of the wheel 30.

The body 208 also has arcuate recesses 216 facing the inner member 190. Each of the recesses 216 has a vertical wall 218 and a sloping bottom 220, with ends of the pins 200 being received in the recesses 216. The body 208 has a passage or central bore 222 which rotatably receives the drive shaft 64 with the body 208 being held against the body 194 by an outer pin 224 and a washer 226. Of course, the pins and recesses could be reversed, if desired.

In normal operation, the inner member 190 moves with the drive shaft 64 with the pins 200 engaging the vertical walls 218 of the recesses 216. Consequently, the outer member 192 is driven by the inner member 190 and drives the wheel 30 forwardly. If the mower should be turned so that the wheel 30 tends to move a farther distance and rotate faster than the wheel 28, the outer member 192 will then rotate faster than the inner member 190 with the pins 200 then cammed up the sloping bottoms 220 of the recesses 216 and received in the next recesses as long as the outer member 192 continues to rotate faster than the inner member 190. Hence, with this arrangement, a differential effect is obtained so that the wheels can rotate independently, when moving faster, and avoid skidding or wear on the tires.

As shown in FIGS. 3 and 4, the transmission can have a vent 228 in the upper half 58 to prevent undue pressure buildup therein.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. In combination, a self-propelled rotary lawn mower having a deck, two substantially aligned drive wheels rotatably supported by said deck, a handle extending upwardly from said deck, an engine mounted above said deck and having a drive shaft extending therethrough, a mower blade affixed to said drive shaft below said deck, a drive pulley affixed to said drive shaft above said mower blade, a transmission having a housing, means mounting said transmission on the lawn mower, an input shaft extending upwardly from said housing and having a driven pulley, a belt connecting said drive pulley and said driven pulley, a first gear mounted on said input shaft within said housing, an output shaft mounted in said housing and extending horizontally outwardly beyond opposite sides thereof, a second gear rotatably mounted on said output shaft in said housing and meshing with said first gear, a clutch dog within said housing affixed to said output shaft at one side of said second gear for rotation with said output shaft and for longitudinal movement with respect thereto, said clutch dog having an engaged position engaged with said second gear and a disengaged position spaced from said second gear, a shifter fork carried by said housing and engagable with said clutch dog, a shift lever carried by said housing for moving said shifter fork and said clutch dog between its two positions, said shift lever being movable by remote control means mounted on the handle of said lawn mower, and means on opposite end portions of said output shaft engagable with said two drive wheels of said mower for driving same.

2. Drive means according to claim 1 characterized by said last-named means each comprises an inner member affixed to and rotatable with said output shaft, an outer member adjacent said inner member and having tooth means engagable with tooth means of the associated wheel, pin means carried by one of said members, resilient means urging said pin means toward the other of said members, the other of said members having a plurality of sloping recesses therein to receive said pin means, whereby said inner member can drive said outer member at the same speed as said inner member and said outer member can rotate at a rate faster than that of said inner member.

3. Drive means according to claim 1 characterized by said driven pulley comprising a stationary pulley half affixed to said input shaft in a fixed position and a movable pulley half mounted on said input shaft for rotation therewith and for axial movement with respect thereto, and remote control means on the mower handle for moving said movable pulley half toward and away from said stationary pulley half.

4. Drive means according to claim 1 characterized by resilient means urging said shifter fork and clutch dog toward the disengaged position of said clutch dog, and said remote control means comprising a control lever carried by the handle of said mower and connected to said shift lever by a flexible cable, said control lever being effective to move said shift lever to the engaged position of said clutch dog when said control lever is grasped by an operator.

5. A compact transmission comprising an input vertical shaft, a worm mounted on said input shaft for rotation therewith, an output shaft, a worm wheel mounted on said output shaft, but rotatably independent thereof and engaged with said worm, a clutch dog mounted on said output shaft to one side of said worm wheel and affixed thereto for rotation with said output shaft and for longitudinal movement with respect thereto, a shifter fork engagable with said clutch dog, lever means engagable with said shifter fork for moving said clutch dog between only two positions, a position engaged with said worm wheel and a position disengaged from said worm wheel, resilient means for urging said shifter fork and said clutch dog toward the disengaged position of said clutch dog, and a remote control lever connected to said lever means to move said lever means to the engaged position of said clutch dog when said control lever is grasped by an operator, and said resilient means moving said shifter fork and said clutch dog toward the disengaged position of said clutch dog when said control lever is not grasped by the operator.

6. A compact transmission according to claim 5 characterized by said output shaft having means affixed directly to end portions thereof for engaging and driving wheels of a self-propelled power lawn mower.

7. A compact transmission according to claim 6 characterized by said last-named means each comprising an inner member affixed to and rotatable with said output shaft, an outer member adjacent said inner member and having tooth means engagable with tooth means of the associated wheel, pin means carried by one of said members, resilient means urging said pin means toward the other of said members, the other said members having a plurality of sloping recesses therein to receive said pin means, whereby said inner member can drive said outer member at the same speed as said inner member and said outer member can rotate at a rate faster than that of said inner member.

8. A compact transmission according to claim 5 characterized by a pulley on said input shaft, said pulley comprising a stationary pulley half affixed to said input shaft in a fixed position, and a movable pulley half mounted on said input shaft for rotation therewith and for axial movement with respect thereto, and remote control means for moving said movable pulley half toward and away from said stationary pulley half.

9. A transmission comprising a housing, an input shaft extending upwardly from said housing, an output shaft extending from said housing, gear means within said housing connecting said input shaft and said output shaft, a belt pulley on said input shaft above said housing and comprising a stationary pulley half affixed to said input shaft and a movable pulley half mounted on said input shaft between said housing and said stationary pulley half for rotatable movement therewith and for longitudinal movement with respect thereto, and means engagable with said movable pulley half for moving said movable half toward and away from said stationary half, said engagable means comprising projecting means structurally integral with said housing and having sloping walls, a hub having projecting means in the form of sloping walls cooperating with said sloping walls of said housing projecting means to cause said hub to move toward and away from said stationary pulley half when said hub is turned, said hub having an opening through which said input shaft extends, a lever affixed to said hub for turning said hub when said lever is turned, and bearing means located between said hub and said movable pulley half.

10. In combination, a self-propelled rotary lawn mower having a deck, two substantially aligned drive wheels rotatably supported by said deck, a handle extending upwardly from said deck, an engine mounted above said deck and having a drive shaft extending therethrough, a mower blade affixed to said drive shaft below said deck, a drive pulley affixed to said drive shaft above said mower blade, a transmission having a housing, means mounting said transmission on the lawn mower, an input shaft extending upwardly from said housing and having a driven pulley, a belt connecting said drive pulley and said driven pulley, a first gear mounted on said input shaft within said housing, an output shaft mounted in said housing and extending horizontally outwardly beyond opposite sides thereof, a second gear mounted on said output shaft in said housing and meshing with said first gear, a clutch dog within said housing and having an engaged position engaged with said second gear and a disengaged position spaced from said second gear, a shifter fork carried by said housing and engagable with said clutch dog, a shift lever carried by said housing for moving said shifter fork and said clutch dog between its two positions, resilient means for urging said shifter fork and said clutch dog toward the disengaged position of said clutch dog, a remote control lever connected to said shift lever to move said shift lever to the engaged position of said clutch dog when said control lever is grasped by an operator, said resilient means moving said shifter fork and said clutch dog toward the disengaged position of said clutch dog when said control lever is not grasped by the operator, and means on opposite end portions of said output shaft engagable with said two drive wheels of said mower for driving same.

* * * * *